United States Patent
Hu et al.

(10) Patent No.: US 12,418,581 B2
(45) Date of Patent: Sep. 16, 2025

(54) CONTAINER QUANTITY ADJUSTMENT FOR APPLICATION

(71) Applicant: Alipay (Hangzhou) Information Technology Co., Ltd., Zhejiang (CN)

(72) Inventors: Yun Hu, Hangzhou (CN); Lei Lei, Hangzhou (CN); Yangfei Zheng, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/397,379

(22) Filed: Dec. 27, 2023

(65) Prior Publication Data
US 2024/0137411 A1 Apr. 25, 2024

Related U.S. Application Data

(63) Continuation of application No. PCT/CN2022/124500, filed on Oct. 11, 2022.

(30) Foreign Application Priority Data

Oct. 12, 2021 (CN) .......................... 202111187472.9

(51) Int. Cl.
*H04L 41/0897* (2022.01)
*H04L 41/16* (2022.01)
*H04L 67/1025* (2022.01)

(52) U.S. Cl.
CPC ...... *H04L 67/1025* (2013.01); *H04L 41/0897* (2022.05); *H04L 41/16* (2013.01)

(58) Field of Classification Search
None
See application file for complete search history.

(56) References Cited

U.S. PATENT DOCUMENTS

2015/0288573 A1   10/2015   Baughman et al.
2017/0331705 A1   11/2017   Jiang et al.
(Continued)

FOREIGN PATENT DOCUMENTS

CN   108093046   5/2018
CN   111026550   4/2020
(Continued)

OTHER PUBLICATIONS

Cao et al., "A deep learning Based Elastic Retractable Algorithm for Cloud Platform," Computer and Modernization, Apr. 26, 2019, 8 pages (with English Abstract).
(Continued)

*Primary Examiner* — Joshua Joo
(74) *Attorney, Agent, or Firm* — Fish & Richardson P.C.

(57) ABSTRACT

Implementations of methods and apparatuses for container quantity adjustment are disclosed. In an implementation, a method includes: determining historical data of an application, predicting traffic distribution of the application within a predetermined duration based on the historical data by using a pre-trained traffic prediction model, predicting container quantity distribution of the application within the predetermined duration based on the traffic distribution and a predetermined target utilization of a container by using a pre-trained quantity prediction model, and adjusting a container quantity of the application at each of a plurality of predetermined moments within the predetermined duration based on the container quantity distribution.

20 Claims, 5 Drawing Sheets

(56) References Cited

U.S. PATENT DOCUMENTS

| | | | |
|---|---|---|---|
| 2018/0287956 A1 | 10/2018 | Bryc et al. | |
| 2019/0272002 A1 | 9/2019 | Seenappa et al. | |
| 2019/0286486 A1* | 9/2019 | Ma | G06F 9/5027 |
| 2020/0379907 A1* | 12/2020 | Rostykus | G06F 9/505 |
| 2021/0064432 A1 | 3/2021 | Benmakrelouf et al. | |
| 2021/0133569 A1 | 5/2021 | Li et al. | |
| 2021/0240517 A1* | 8/2021 | Mohapatra | G06F 9/445 |
| 2022/0092480 A1* | 3/2022 | Mahadik | G06N 20/10 |
| 2022/0164186 A1* | 5/2022 | Pamidala | G06F 18/2155 |
| 2023/0050796 A1* | 2/2023 | Ghergu | G06F 9/505 |

FOREIGN PATENT DOCUMENTS

| | | |
|---|---|---|
| CN | 111030869 | 4/2020 |
| CN | 111079980 | 4/2020 |
| CN | 111143033 | 5/2020 |
| CN | 112084040 | 12/2020 |
| CN | 112087504 | 12/2020 |
| CN | 112289391 | 1/2021 |
| CN | 113992525 | 1/2022 |
| CN | 115037655 | 9/2022 |
| CN | 115550259 | 12/2022 |
| CN | 116167463 | 5/2023 |
| CN | 117451284 | 1/2024 |
| WO | WO 2018/214060 | 11/2018 |
| WO | WO 2020/233020 | 11/2020 |
| WO | WO 2021/174811 | 9/2021 |
| WO | WO 2023/061348 | 4/2023 |

OTHER PUBLICATIONS

Hao et al., "Elastic Resource Provisioning Approach for Container in Micro-Service Architecture," Journal of Computer Research and Development, 2017, 54(3): 597-608 (with English Abstract).

International Preliminary Report on Patentability in International Appln. No. PCT/CN2022/124500, mailed on Apr. 25, 2024, 12 pages (with English translation).

International Search Report and Written Opinion in International Appln. No. PCT/CN2022/124500, mailed on Jan. 11, 2023, 14 pages (with English translation).

Sun et al., "AutoScale: Adaptive QoS-Aware Container-based Cloud Applications Scheduling Framework," TIIS, 2019, 13(6):2824-37.

Shao et al., "Energy-Aware Dynamic Resource Allocation on Hadoop YARN Cluster," Paper, Presented at the 2016 IEEE 18th International Conference on High Performance Computing and Communications, IEEE 14th International Conference on Smart City, and IEEE 2nd International Conference on Data Science and Systems, Sydney, NSW, Australia, Dec. 14-16, 2016; IEEE, Jan. 26, 2017, pp. 364-371.

Xie et al., "Resource prediction model study based on Kubernetes load characteristics," Network security technology & application, Apr. 15, 2018, 4:27-28, 6 pages (with machine translation).

\* cited by examiner

CONTAINER QUANTITY ADJUSTMENT FOR APPLICATION

CROSS-REFERENCE TO RELATED APPLICATIONS

This application is a continuation of PCT Application No. PCT/CN2022/124500, filed on Oct. 11, 2022, which claims priority to Chinese Patent Application No. 202111187472.9, filed on Oct. 12, 2021, and each application is hereby incorporated by reference in its entirety.

TECHNICAL FIELD

This specification relates to the field of computer technologies, and in particular to container quantity adjustment methods and apparatuses for an application.

BACKGROUND

For a containerized application, properly allocating container resources to be occupied by the application and flexibly adjusting, based on a running status of the application, a quantity of containers that support application running is a key to avoiding an application running fault and maintaining a good running status of the application.

In the existing technology, traffic of an application at each moment is monitored to adjust a quantity of containers based on the traffic at each moment and a predetermined service level objective (SLO). Without violating the SLO, when the traffic of the application increases, the quantity of containers is increased based on an increased traffic value, or when the traffic of the application decreases, the quantity of containers is decreased based on a decreased traffic value.

However, in the existing adjustment method, post-adjustment is performed based on a traffic change. To be specific, a quantity of containers is adjusted only after the traffic change is monitored. Therefore, a problem that the quantity of containers is not adjusted in a timely manner is likely to occur, resulting in an application running limitation or even fault.

SUMMARY

This specification provides container quantity adjustment methods and apparatuses for an application to partially resolve the above-mentioned problems in the existing technology.

The following technical solutions are used in this specification. This specification provides a container quantity adjustment method for an application, including the following: determining historical data of an application, where the historical data include at least actual traffic of the application at each historical moment; predicting traffic distribution of the application within predetermined duration based on the historical data by using a pre-trained traffic prediction model; predicting container quantity distribution of the application within the predetermined duration based on the traffic distribution and a predetermined target utilization of a container by using a pre-trained quantity prediction model; and adjusting a container quantity of the application at each moment within the predetermined duration based on the container quantity distribution.

Optionally, the determining historical data of an application specifically includes the following: determining historical quantity distribution based on a container quantity configured for the application at each historical moment; and determining the historical data of the application when determining, based on the historical quantity distribution, that the container quantity of the application at each historical moment changes periodically.

Optionally, the method further includes the following: determining a period length of a container quantity change of the application based on the historical quantity distribution; determining each target historical period based on a predetermined period quantity and the period length; determining a container quantity at each historical moment in each target historical period based on the historical quantity distribution; and determining the container quantity at each moment within the predetermined duration as periodic quantity distribution based on the container quantity at each historical moment in each target historical period.

Optionally, the adjusting a container quantity of the application at each moment within the predetermined duration based on the container quantity distribution specifically includes the following: determining target quantity distribution based on the container quantity distribution and the periodic quantity distribution; and adjusting the container quantity of the application at each moment within the predetermined duration based on the target quantity distribution.

Optionally, the adjusting a container quantity of the application at each moment within the predetermined duration based on the container quantity distribution specifically includes the following: for each moment within the predetermined duration, determining predicted traffic corresponding to the moment based on the traffic distribution and determining, based on the container quantity distribution, a container quantity that should be configured for the application at the moment; determining, based on the determined traffic at the moment and the container quantity, a predicted utilization of a processor in the container that corresponds to the moment; and adjusting the container quantity based on the predicted utilization at the moment by using the target utilization as a target.

Optionally, the historical data further include historical predicted traffic of the application at each historical moment, a historical predicted quantity of containers, and a historical actual utilization of a processor in the container; and the adjusting a container quantity of the application at each moment within the predetermined duration based on the container quantity distribution specifically includes the following: determining a historical predicted utilization at each historical moment based on historical predicted traffic and a historical predicted quantity at each historical moment within the predetermined duration before a current moment; determining accuracy of the quantity prediction model based on the historical actual utilization and the historical predicted utilization at each historical moment; and adjusting the container quantity of the application at each moment within the predetermined duration based on the container quantity distribution when the accuracy is greater than a predetermined proportion threshold; or determining the container quantity of the application at each moment within the predetermined duration based on initialized quantity distribution of the application when the accuracy is not greater than a predetermined proportion threshold.

Optionally, the determining accuracy of the quantity prediction model based on the historical actual utilization and the historical predicted utilization at each historical moment specifically includes the following: for each historical moment within the predetermined duration before the current moment, determining a difference between a historical predicted utilization and a historical actual utilization at the historical moment as a utilization difference at the historical moment; determining a quantity of historical moments that are within the predetermined duration before the current moment and at which a utilization difference is less than a predetermined difference threshold as a compliance quantity; and determining the accuracy based on the compliance quantity and a total quantity of historical moments within the predetermined duration before the current moment.

Optionally, the method further includes the following: determining a loss based on the utilization difference corresponding to each historical moment within the predetermined duration before the current moment; and adjusting parameters of the quantity prediction model and the traffic prediction model with a goal of minimizing the loss.

Optionally, the method further includes the following: obtaining a running indicator of the application; predicting the container quantity distribution of the application within the predetermined duration as reinforced quantity distribution based on the running indicator and the target utilization by using a reinforced prediction model obtained through advance reinforcement learning; and adjusting the container quantity of the application at each moment within the predetermined duration based on the reinforced quantity distribution when evaluation on the quantity prediction model fails.

Optionally, the predicting traffic distribution of the application within predetermined duration based on the historical data by using a pre-trained traffic prediction model specifically includes the following: for each predetermined traffic data type, determining branch traffic corresponding to the traffic data type at each historical moment; and predicting each piece of branch traffic of the application at each moment within the predetermined duration as the traffic distribution of the application within the predetermined duration based on the branch traffic corresponding to each traffic data type at each historical moment by using the pre-trained traffic prediction model.

Optionally, the predicting container quantity distribution of the application within the predetermined duration based on the traffic distribution and a predetermined target utilization of a container by using a pre-trained quantity prediction model specifically includes the following: inputting each piece of branch traffic at each moment within the predetermined duration and the predetermined target utilization of the container to the pre-trained quantity prediction model and determining a container quantity that should be configured for the application at each moment within the predetermined duration, where the container quantity includes a container quantity corresponding to each piece of branch traffic, and for same traffic, container quantities corresponding to different branch traffic are not exactly the same.

Optionally, the adjusting a container quantity of the application at each moment within the predetermined duration based on the container quantity distribution specifically includes the following: determining an application profile of the application and determining, based on the application profile, an adjustment mode suitable for the application; and adjusting the container quantity of the application at each moment within the predetermined duration based on the adjustment mode and the container quantity distribution.

This specification provides a container quantity adjustment apparatus for an application, including the following: a historical data determining module, configured to determine historical data of an application, where the historical data include at least actual traffic of the application at each historical moment; a traffic prediction module, configured to predict traffic distribution of the application within predetermined duration based on the historical data by using a pre-trained traffic prediction model; a quantity prediction module, configured to predict container quantity distribution of the application within the predetermined duration based on the traffic distribution and a predetermined target utilization of a container by using a pre-trained quantity prediction model; and an adjustment module, configured to adjust a container quantity of the application at each moment within the predetermined duration based on the container quantity distribution.

This specification provides a computer-readable storage medium. The storage medium stores a computer program, and when the computer program is executed by a processor, the above-mentioned container quantity adjustment method for an application is implemented.

This specification provides an electronic device, including a storage device, a processor, and a computer program stored in the storage device. The computer program can be run on a processor, and when the processor executes the program, the above-mentioned container quantity adjustment method for an application is implemented.

At least one of the above-mentioned technical solutions used in this specification can achieve the following beneficial effects: In the container quantity adjustment method for an application provided in this specification, traffic distribution of an application within future predetermined duration is predicted based on historical data of the application by using a pre-trained traffic prediction model. Container quantity distribution of the application within the predetermined duration is predicted based on predicted traffic distribution by using a pre-trained quantity prediction model. A container quantity of the application at each moment within the predetermined duration is adjusted based on obtained container quantity distribution.

It can be seen from the above-mentioned method that, in the method, traffic of an application within future predetermined duration can be predicted in advance, to obtain a corresponding container quantity to be deployed at each moment and adjust the container quantity of the application at each moment in a timely manner.

BRIEF DESCRIPTION OF DRAWINGS

The accompanying drawings described here are used to provide further understanding of the specification and constitute a part of the specification. The example embodiments of the specification and their descriptions are used to explain the specification, and do not constitute an undue limitation on the specification. In the accompanying drawings.

DESCRIPTION OF EMBODIMENTS

To make the objectives, technical solutions, and advantages of this specification clearer, the following clearly and comprehensively describes the technical solutions of this specification with reference to specific embodiments of this specification and corresponding accompanying drawings. It is clear that the described embodiments are merely some but not all of embodiments of this specification. Based on embodiments of this specification, all other embodiments obtained by a person of ordinary skill in the art without creative efforts fall within the protection scope of this specification.

The following describes in detail the technical solutions provided in embodiments of this specification with reference to the accompanying drawings.

Figure 1:
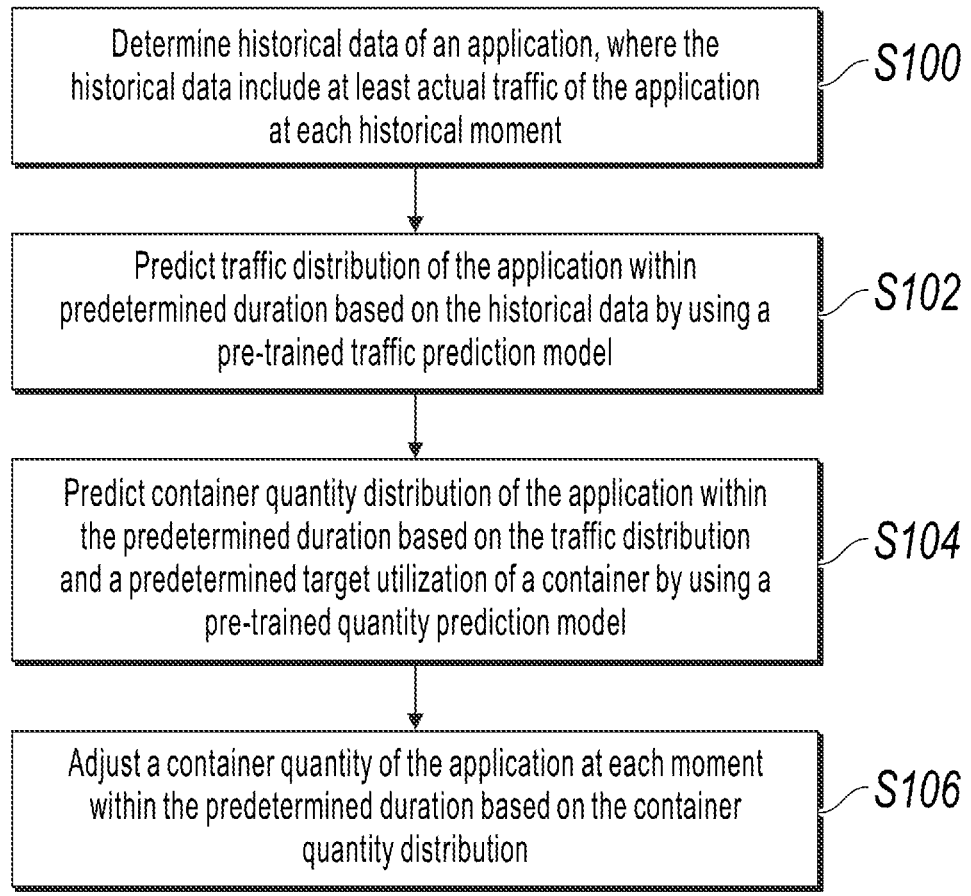
FIG. 1 is a schematic flowchart illustrating a container quantity adjustment method for an application, according to this specification.

FIG. 1 is a schematic flowchart illustrating a container quantity adjustment method for an application in this specification. The method specifically includes the following steps. S100: Determine historical data of an application, where the historical data include at least actual traffic of the application at each historical moment.

In this specification, the container quantity adjustment method for an application can be performed by a server.

To adjust a container quantity of the application at each moment in a timely manner and avoid that adjustment is not timely, in this specification, the container quantity of the application at each moment can be predicted in advance by using a model, and the container quantity configured for the application at each moment and supporting application running is adjusted in a timely manner based on a predicted container quantity.

Because a historical running status of the application is known and can reflect a long-term demand of the application for a container quantity and a demand change, a demand of the application for a container quantity at each future moment can be predicted based on the historical data of the application.

Therefore, in one or more embodiments of this specification, the server can first determine the historical data of the application, and the historical data include at least the actual traffic of the application at each historical moment. In other words, traffic of the application at each moment in a running process in history is determined. As such, traffic of the application at each future moment, that is, predicted traffic at each future moment, is predicted based on the actual traffic in history in the subsequent step.

In one or more embodiments of this specification, because there may be a special case that application traffic is not captured, that is, there may be a case that traffic is not captured at a specific moment, after determining the historical data, the server can preprocess the historical data and then predict traffic distribution based on preprocessed historical data. Specifically, for each historical moment at which traffic is not captured, the server can determine actual traffic at the historical moment based on actual traffic corresponding to adjacent historical moments before and after the historical moment. For example, an average value of the actual traffic corresponding to the adjacent historical moments before and after the historical moment can be used as the actual traffic at the historical moment, or a maximum value, a minimum value, etc. can be used, which can be specifically set as needed and is not limited in this specification.

Certainly, the actual traffic at the historical moment is specifically determined based on several historical moments before and after the historical moment. This can be flexibly set. For example, a time interval can be predetermined, and the adjacent historical moments are determined based on the time interval. For example, if the time interval is 3, the server can determine the actual traffic at the historical moment based on actual traffic corresponding to three adjacent historical moments before the historical moment and actual traffic corresponding to three adjacent historical moments after the historical moment.

S102: Predict traffic distribution of the application within predetermined duration based on the historical data by using a pre-trained traffic prediction model.

In one or more embodiments of this specification, the server can predict traffic of the application at each moment within the predetermined duration based on the historical data of the application by using the pre-trained traffic prediction model, to obtain the traffic distribution of the application corresponding to the predetermined duration, that is, predict the traffic distribution of the application within the predetermined duration. As such, in the subsequent step, the server can further predict container quantity distribution of the application within the predetermined duration based on the traffic distribution.

The predetermined duration is a predetermined future period of time in which a container quantity of the application needs to be predicted. For example, the predetermined duration can be one day in the future, one hour in the future, eight hours in the future, etc. or certainly can be other duration, and can be specifically set as needed. This specification sets no limitation here. The historical data can be long-term accumulated historical data of the application. The server can determine at least a part of the historical data and input the part of the historical data to the traffic prediction model, to obtain the traffic distribution within the predetermined duration. Alternatively, the historical data can correspond to input of the traffic prediction model. For example, if the input of the traffic prediction model is historical data within two months before a current moment, the server can directly determine historical data of the application in two months, and does not need to determine the long-term accumulated historical data of the application.

In one or more embodiments of this specification, the server can perform the container quantity adjustment method for an application at a date demarcation point or moments before and after the demarcation point. For example, container quantity distribution of the application on day 8 can be predicted at 00:00 of day 8 (or 23:59 of day 7) based on historical data before 00:00. Certainly, 00:00 is only an example, and can be another time point. This specification sets no limitation here.

S104: Predict container quantity distribution of the application within the predetermined duration based on the traffic distribution and a predetermined target utilization of a container by using a pre-trained quantity prediction model.

In one or more embodiments of this specification, the server can predict, based on the predicted traffic distribution and the predetermined target utilization of the container by using the pre-trained prediction model, a container quantity that should be configured for the application at each moment within the predetermined duration, to obtain the container quantity distribution of the application within the predetermined duration, that is, predict the container quantity distribution of the application within the predetermined duration.

The target utilization is a target utilization of a processor in the container, and can be determined based on at least a historical utilization of the application.

S106: Adjust a container quantity of the application at each moment within the predetermined duration based on the container quantity distribution.

In one or more embodiments of this specification, after determining the container quantity distribution of the application within the predetermined duration, the server can adjust the container quantity of the application at each moment within the predetermined duration based on the container quantity distribution.

Usually, different applications have corresponding initialized container quantities. The container quantity of the application is adjusted after the container quantity of the application is initialized, and adjustment is performed based on initialization for obtaining initialized container quantity distribution within the predetermined duration, that is, the container quantity is increased or decreased based on an initialized quantity at each moment within the predetermined duration. Therefore, in this specification, after the container quantity of the application is initialized, the container quantity can be adjusted based on the obtained initialized quantity at each moment within the predetermined duration and the predicted container quantity at each moment. For example, assume that the predetermined duration corresponds to one hour in the future. At the third minute within the predetermined duration, that is, at a third moment, an initialized container quantity is 4, and a predicted container quantity is 6. The predicted container quantity at the moment can be used as a target to adjust a container quantity of the application at the moment. Therefore, the container quantity of the application in the third minute within the predetermined duration can be increased by 2 to reach 6.

In one or more embodiments of this specification, a container of an application can correspond to specified resources for running the application, such as computing resources and storage resources. For example, one container can correspond to four processor cores.

In one or more embodiments of this specification, the traffic prediction model and the quantity prediction model can be considered as one prediction model. A structure of the prediction model can be shown in FIG. 2.

Figure 2:
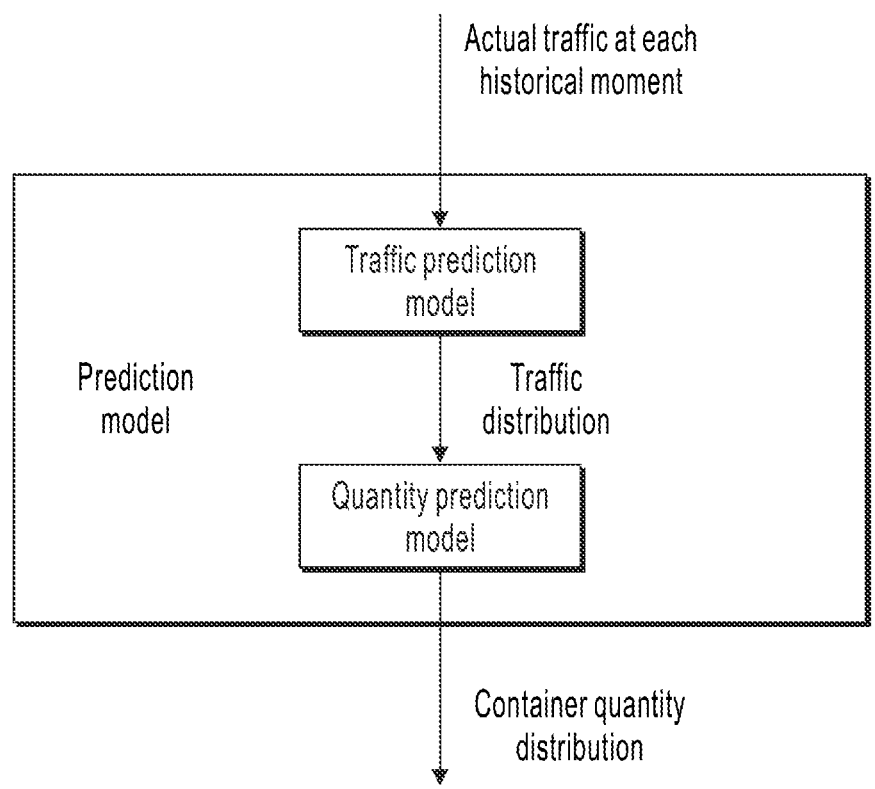
FIG. 2 is a schematic diagram illustrating a prediction model, according to this specification.

FIG. 2 is a schematic diagram illustrating a prediction model according to this specification. As shown in the figure, the prediction model includes a traffic prediction model and a quantity prediction model. After actual traffic at each historical moment is input to the traffic prediction model, traffic distribution within predetermined duration after a current moment is obtained. After the traffic distribution is input to the quantity prediction model, container quantity distribution within the predetermined duration can be obtained.

Based on the container quantity adjustment method for an application shown in FIG. 1, the traffic distribution of the application within the future predetermined duration is predicted based on the historical data of the application by using the pre-trained traffic prediction model. The container quantity distribution of the application within the predetermined duration is predicted based on the predicted traffic distribution by using the pre-trained quantity prediction model. The container quantity of the application at each moment within the predetermined duration is adjusted based on the obtained container quantity distribution.

It can be seen from the above-mentioned method that, in the method, traffic of the application within the future predetermined duration can be predicted in advance, to obtain the corresponding container quantity to be deployed at each moment and adjust the container quantity of the application at each moment in a timely manner.

In addition, to make adjustment on the container quantity as reliable as possible, the server can further evaluate the quantity prediction model based on predicted data and actual data of the quantity prediction model at each historical moment.

In one or more embodiments of this specification, the historical data of the application can further include historical predicted traffic of the application at each historical moment, a historical predicted quantity of containers, and a historical actual utilization of a processor in the container. The server can evaluate the quantity prediction model based on an actual utilization and a historical utilization at each historical moment.

Specifically, the server can determine a historical predicted utilization at each historical moment based on historical predicted traffic and a historical predicted quantity at each historical moment within predetermined duration before the current moment; and determine accuracy of the quantity prediction model based on the historical actual utilization and the historical predicted utilization at each historical moment. When the accuracy is greater than a predetermined proportion threshold, the evaluation succeeds, it is determined that a prediction result of the quantity prediction model is accurate enough, and the server can adjust the container quantity of the application at each moment within the predetermined duration based on the container quantity distribution. When the accuracy is not greater than a predetermined proportion threshold, the evaluation fails, and the server can determine the container quantity of the application at each moment within the predetermined duration based on initialized quantity distribution of the application.

In one or more embodiments of this specification, the server can determine, from the historical data, some historical data corresponding to first 24 hours of the predetermined duration, to evaluate the quantity prediction model.

In one or more embodiments of this specification, the server can further determine a loss based on a utilization difference corresponding to each historical moment within the predetermined duration before the current moment; and adjust parameters of the quantity prediction model and the traffic prediction model with a goal of minimizing the loss.

In one or more embodiments of this specification, when determining the accuracy of the quantity prediction model, for each historical moment within the predetermined duration before the current moment, the server can determine a difference between a historical predicted utilization and a historical actual utilization at the historical moment as a utilization difference at the historical moment; determine a quantity of historical moments that are within the predetermined duration before the current moment and at which a utilization difference is less than a predetermined difference threshold as a compliance quantity; and then determine the accuracy based on the compliance quantity and a total quantity of historical moments within the predetermined duration before the current moment.

In one or more embodiments of this specification, a ratio of the compliance quantity to the total quantity of historical moments within the predetermined duration before the current moment can be used as the accuracy.

In one or more embodiments of this specification, the server can further determine a non-compliance quantity based on a difference between the total quantity and the compliance quantity, and determine the accuracy based on a ratio of the compliance quantity to the non-compliance quantity.

In one or more embodiments of this specification, for each historical moment within the predetermined duration before the current moment, when the utilization difference at the historical moment is less than the predetermined difference threshold, it is determined that a predicted container quantity corresponding to the historical moment is accurate, and a prediction result at the historical moment reaches a standard. The compliance quantity is a quantity of historical moments at which a predicted container quantity is accurate within the predetermined duration before the current moment.

The difference threshold and the proportion threshold can be specifically set as needed. This specification sets no limitation here. For example, the proportion threshold can be 80%.

In one or more embodiments of this specification, the quantity prediction model can be evaluated in the following three aspects: a result difference, a deviation direction, and a deviation proportion. The result difference is a difference between a historical predicted utilization at each historical moment and a corresponding actual utilization, that is, a utilization difference at each historical moment. The deviation direction means whether the historical predicted utilization is larger or smaller than the actual utilization. The deviation proportion is a proportion of moments at which a difference between the result difference and the predetermined difference threshold is greater than a predetermined value.

In one or more embodiments of this specification, a value of the result difference is negatively correlated with accuracy of a prediction result of the quantity prediction model, and a smaller result difference indicates a higher possibility that evaluation on the quantity prediction model succeeds. To ensure normal running of the application, even if the predicted container quantity of the application is not accurate enough, the predicted container quantity is expected to be larger than a container quantity that should be actually configured for the application as much as possible, to avoid a limitation on running of the application due to a lack of a container capacity. Therefore, when the historical predicted utilization at each historical moment is larger than the actual utilization, evaluation on the quantity prediction model is more likely to succeed. When the deviation proportion is smaller, evaluation on the quantity prediction model is more likely to succeed, that is, when a non-deviation proportion is larger, evaluation on the quantity prediction model is more likely to succeed. When the non-deviation proportion is greater than the predetermined proportion threshold, evaluation succeeds. The non-deviation proportion can correspond to the above-mentioned accuracy.

In one or more embodiments of this specification, evaluation can be performed based on one or more of the result difference, the deviation direction, and the deviation proportion. Specifically, how to perform evaluation based on one or more of the result difference, the deviation direction, and the deviation proportion is not limited in this specification and can be set as needed.

In one or more embodiments of this specification, the container quantity may not be predicted based on traffic. The server can predict the container quantity based on a running indicator generated in an application running process by using a reinforced prediction model obtained through reinforcement learning.

In one or more embodiments of this specification, when evaluation on the quantity prediction model fails, the server can further predict the container quantity at each moment within the predetermined duration by using the reinforced prediction model obtained through reinforcement learning, and adjust the container quantity of the application in step S106 based on the container quantity at each moment within the predetermined duration predicted by using the reinforced prediction model.

In one or more embodiments of this specification, the server can obtain the running indicator of the application, and determine, based on the running indicator and the predetermined target utilization by using the reinforced prediction model obtained through advance reinforcement learning, the container quantity that should be configured for the application at each moment within the predetermined duration, to obtain container quantity distribution of the application within the predetermined duration as reinforced quantity distribution. The container quantity of the application at each moment within the predetermined duration is adjusted based on the reinforced quantity distribution when evaluation on the quantity prediction model fails.

The running indicator includes indicator data generated by the application in a running process, for example, a quantity of thread switching times, a quantity of traffic data packets, a quantity of loads, and a quantity of garbage collection (GC) triggering times.

In one or more embodiments of this specification, the running indicator can be an indicator at a moment level. For example, if one minute is one moment, the running indicator is an indicator at a minute level. A running indicator at each moment before the predetermined duration that belongs to the same time period as the predetermined duration can be specifically used. For example, if the predetermined duration is one hour and the predetermined duration is the third hour of the day including the predetermined duration, the running indicator can be a running indicator at each moment in the third hour of the previous day.

In one or more embodiments of this specification, the running indicator can further include traffic, which can be specifically actual traffic at each moment before the predetermined duration that belongs to the same time period as the predetermined duration.

In one or more embodiments of this specification, the server can determine a loss of the reinforced prediction model based on a difference between a utilization corresponding to each moment within the predetermined duration predicted by using the reinforced prediction model and an actual utilization at each moment within the predetermined duration, and adjust a parameter of the reinforced prediction model with a goal of minimizing the loss.

In one or more embodiments of this specification, the server can further directly predict the container quantity based on the running indicator of the application by using the reinforced prediction model; and adjust the container quantity of the application at each moment within the predetermined duration based on the reinforced quantity distribution predicted by using the reinforced prediction model. In other words, the reinforced prediction model can be used regardless of whether evaluation on the quantity prediction model fails. The running indicator of the application can be directly obtained, and the container quantity that should be configured for the application at each moment within the predetermined duration is determined based on the running indicator by using the reinforced prediction model obtained through advance reinforcement learning, to predict container quantity distribution of the application within the predetermined duration as reinforced quantity distribution. The container quantity of the application at each moment within the predetermined duration is adjusted based on the reinforced quantity distribution.

In other words, in one or more embodiments of this specification, the server can predict the container quantity by using the quantity prediction model and the reinforced prediction model, and select a prediction result of a specific model based on an evaluation result for the quantity prediction model according to a rule of first adjusting the container quantity of the application within the predetermined duration based on a prediction result of the quantity prediction model, to adjust the container quantity. Alternatively, the server can perform prediction by using only one of the quantity prediction model and the reinforced prediction model, and adjust the container quantity of the application within the predetermined duration based on one obtained prediction result.

In one or more embodiments of this specification, to ensure normal running of the application to the greatest extent, after predicting the container quantity distribution and the reinforced quantity distribution by using the quantity prediction model and the reinforced prediction model, for each moment within the predetermined duration, the server can further adjust the container quantity of the application at the moment within the predetermined duration based on a maximum value in a container quantity corresponding to the moment in the container quantity distribution and a container quantity corresponding to the moment in the reinforced quantity distribution.

In one or more embodiments of this specification, the server can further evaluate the reinforced prediction model to determine accuracy of the reinforced prediction model, and when the accuracy of the reinforced prediction model is greater than the predetermined proportion threshold, adjust the container quantity of the application at each moment within the predetermined duration based on the reinforced quantity distribution output by the reinforced prediction model. When the accuracy of the reinforced prediction model is not greater than the predetermined proportion threshold, the container quantity of the application at each moment within the predetermined duration is determined based on initialized quantity distribution of the application.

In one or more embodiments of this specification, before performing prediction by using the traffic prediction model, the server can further first evaluate the quantity prediction model, and then perform prediction by using the quantity prediction model when evaluation succeeds. In other words, there is no need to first predict the traffic distribution within the predetermined duration by using the traffic prediction model and predict the container quantity distribution based on the traffic distribution and the predetermined target utilization of the container by using the quantity prediction model, and then evaluate the quantity prediction model. Instead, the quantity prediction model is evaluated first. After the evaluation succeeds, prediction is successively performed based on the traffic prediction model and the quantity prediction model, to reduce a calculation amount brought by prediction.

In one or more embodiments of this specification, the server can further perform iterative evaluation when evaluating the quantity prediction model. Specifically, first, the server can determine a loss based on a utilization difference corresponding to each historical moment within the predetermined duration before the current moment that is determined in an evaluation process, to adjust a parameter of the quantity prediction model to obtain an adjusted quantity prediction model. Then, the server performs, based on the adjusted quantity prediction model, the above-mentioned step of determining a historical predicted utilization at each historical moment based on historical predicted traffic and a historical predicted quantity at each historical moment within predetermined duration before the current moment. Finally, the server performs evaluation based on the historical predicted utilization at each historical moment, the utilization difference, the predetermined difference threshold, and the predetermined proportion threshold.

In other words, after adjusting the parameter of the quantity prediction model, the server can re-predict the traffic and the container quantity at each historical moment within the predetermined duration before the current moment based on the historical data by using the adjusted quantity prediction model, and re-determine the historical predicted utilization at each historical moment within the predetermined duration before the current moment based on a prediction result, to re-evaluate the adjusted quantity prediction model based on the re-determined historical predicted utilization at each historical moment and the historical actual utilization. After the re-evaluation succeeds, the server can further predict the traffic at each moment within the predetermined duration by using the traffic prediction model, to further predict the container quantity at each moment within the predetermined duration by using the quantity prediction model. If the re-evaluation fails, the server can directly determine the container quantity of the application at each moment in the predetermined duration after the current moment based on the initialized quantity distribution.

In one or more embodiments of this specification, when determining, in step S106 based on the container quantity distribution predicted by using the quantity prediction model, the container quantity that should be configured for the application at the moment, the server can directly use the container quantity corresponding to the moment in the container quantity distribution as the container quantity that should be configured for the application at the moment; or when evaluation on the quantity prediction model fails, use the container quantity corresponding to the moment in the reinforced quantity distribution predicted by using the reinforced prediction model as the container quantity that should be configured for the application at the moment. Alternatively, the server can further use the maximum value in the container quantity corresponding to the moment in the container quantity distribution and the container quantity corresponding to the moment in the reinforced quantity distribution as the container quantity that should be configured for the application at the moment. Certainly, an average value, etc. can alternatively be used. This specification sets no limitation here.

In one or more embodiments of this specification, the server can further adjust the container quantity of the application at each moment within the predetermined duration in real time based on a predetermined service level indicator (SLI) and service level objective (SLO) with reference to the predicted container quantity distribution. In other words, the container quantity of the application at each moment within the predetermined duration is flexibly adjusted with reference to the predicted container quantity of the application at each moment within the predetermined duration and actually captured traffic.

In one or more embodiments of this specification, specifically, for each moment within the predetermined duration, the server can determine an actual utilization of a processor at the moment. Then, the server can adjust the container quantity based on the actual utilization at the moment by using the target utilization as a target.

In one or more embodiments of this specification, the server can further adjust, based on the actual utilization at the moment and a predetermined time limitation condition by using the predetermined target utilization of the application as a target, the container quantity configured for the application at the moment.

The target utilization and the predetermined time limitation condition respectively correspond to the SLI and the SLO. The SLI includes a limitation on a relationship between the actual utilization of the application at each moment and the target utilization, and the SLO includes a limitation on a quantity of moments that do not satisfy the SLI within the predetermined duration.

For example, in one or more embodiments of this specification, the SLI can specifically include the following: For each moment within the predetermined duration, an actual utilization of the processor at the moment is not greater than the target utilization. The SLO can specifically include the following: A quantity of moments at which an actual utilization of the processor is greater than the target utilization within the predetermined duration is less than a predetermined moment quantity, that is, a quantity of moments at which a utilization of the processor does not satisfy the SLI within the predetermined duration is less than the predetermined moment quantity.

Within the predetermined duration, for each moment within the predetermined duration, the server can successively determine whether the actual utilization of the application violates the SLO at the moment, that is, whether a quantity of moments at which the utilization of the processor does not satisfy the SLI within the predetermined duration is not less than the predetermined moment quantity. If yes, a container quantity configured for the application at a next moment is adjusted based on a target that an actual utilization at the next moment is less than the target utilization; otherwise, a container quantity configured for the application at the moment is adjusted based on one of a prediction result of the quantity prediction model or a prediction result of the reinforced prediction model.

The predetermined moment can be set as needed. For example, the predetermined moment can be 5, 10, etc. and can be properly set as needed. This specification sets no limitation here.

In addition, for an application with periodicity, it is more accurate to determine future traffic distribution of the application based on historical data of the application. Therefore, before the historical data are determined in step S100, whether the application is a periodic application can be further determined.

Specifically, the server can determine the container quantity of the application at each historical moment as each historical quantity, and determine historical quantity distribution based on each determined historical quantity at each historical moment. Then, the server can determine, based on the historical quantity distribution, whether the container quantity of the application changes periodically. The historical data of the application are determined when it is determined, based on the historical quantity distribution, that the container quantity of the application at each historical moment changes periodically.

In one or more embodiments of this specification, the server does not need to determine long-term historical quantity distribution, provided that the determined historical quantity distribution can reflect periodicity of the application. For example, historical quantity distribution in two months can be determined to determine whether the container quantity of the application changes periodically.

Further, the server can determine, based on the periodicity of the container quantity change of the application, the container quantity of the application at each moment within the predetermined duration as periodic quantity distribution. Specifically, the server can determine a period length of the container quantity change of the application based on the determined historical quantity distribution.

Each target historical period is determined in reverse chronological order based on a predetermined period quantity and the period length through backward tracing from the predetermined duration, and a container quantity at each historical moment within each target historical period is determined based on the historical quantity distribution, to determine the container quantity at each moment within the predetermined duration as the periodic quantity distribution based on the container quantity at each historical moment within each target historical period.

The period length is duration corresponding to one period. The predetermined period quantity is a quantity of periods for backward tracing. The period quantity can be set as needed. This specification sets no limitation here.

In one or more embodiments of this specification, the server can further directly determine the historical quantity distribution and the period length of the container quantity change of the application without determining whether the container quantity of the application changes periodically.

In one or more embodiments of this specification, a time length of the predetermined duration can be the same as or has a multiple relationship with the period length of the application.

In one or more embodiments of this specification, after the container quantity at each historical moment in each target historical period is obtained, the server can determine the periodic quantity distribution of the application at each moment within the predetermined duration based on the container quantity at each historical moment in each target historical period. Specifically, when the period quantity is 1, that is, there is one target historical period, and the period length is not less than the predetermined duration, the server can use the container quantity corresponding to each historical moment in the target historical period as the container quantity configured for the application at each moment within the predetermined duration. When the period length is less than the predetermined duration, the server can segment the predetermined duration based on the period length to determine each time segment, and for a time segment having the same duration as the period length, use the container quantity at each historical moment in the target historical period as a container quantity configured for the application at each moment within the time segment. For a time segment having different duration from the period length, the server can sequentially use, in chronological order, the container quantity at each historical moment in the target historical period as a container quantity configured at each moment within the time segment having different duration from the period length.

The container quantity corresponding to each moment in the target historical period is used as the container quantity configured for the application at each moment within the predetermined duration. In other words, in chronological order within one period, the container quantity corresponding to each moment in the target historical period one-to-one corresponds to the container quantity corresponding to the application at each moment within the predetermined duration. In other words, a container quantity at the ith moment in the target historical period is the same as a container quantity of the application at the ith moment within the predetermined duration.

In one or more embodiments of this specification, the container quantity corresponding to each moment in the target historical period can be increased based on a predetermined value, and each increased container quantity is used as the container quantity corresponding to each moment within the predetermined duration, to ensure as much as possible that the determined container quantity does not limit normal running of the application.

When the period quantity is not 1, for each moment dimension within one period length, the server can determine a container quantity of the application at the moment dimension within the predetermined duration based on a container quantity at the moment dimension in each target historical period.

In one or more embodiments of this specification, the server can determine the container quantity of the application at the moment dimension within the predetermined duration by using a method such as taking a maximum value, an average value, a median value, etc. for the container quantity at the moment dimension in each target historical period.

The time dimension is a position of a moment in one period. For example, if a length of one period is one hour, each minute corresponds to a time dimension. The 10th minute in the period is the 10th time dimension.

In addition, to make the finally predicted container quantity distribution within the predetermined duration as accurate as possible, in this specification, when the traffic distribution within the predetermined duration is predicted based on the historical data by using the traffic prediction model, long-term traffic distribution and short-term traffic distribution can be separately predicted to obtain more abundant traffic distribution and obtain more abundant container quantity distribution based on the traffic distribution.

Therefore, in one or more embodiments of this specification, the traffic distribution can include long-term traffic distribution and short-term traffic distribution, and the container quantity distribution can include long-term quantity distribution and short-term quantity distribution. When performing prediction based on the historical data in step S102, the server can capture first historical data from the historical data of the application based on a first time interval in reverse chronological order, and perform long-term traffic prediction based on the first historical data by using the traffic prediction model, to obtain traffic at each moment within the predetermined duration as the long-term traffic distribution.

In one or more embodiments of this specification, correspondingly, in step S104, the server can output the long-term quantity distribution based on the obtained long-term quantity distribution by using the quantity prediction model.

In addition, because the traffic change can be temporary or sudden, to make the predicted container quantity at each moment within the predetermined duration more accurate, data generated within the predetermined duration can participate in traffic prediction. Therefore, the server can further perform short-term traffic prediction within the predetermined duration. Specifically, the server can divide the predetermined duration to determine each time period. For example, assume that the predetermined duration is one day and one time period can be one hour. Then, the server can successively update, for each time period in chronological order, historical data before the time period, capture second historical data from updated historical data based on a second time interval in reverse chronological order, and obtain traffic at each moment in the time period as short-term traffic distribution in the time period based on the obtained second historical data by using the traffic prediction model.

In one or more embodiments of this specification, correspondingly, in step S104, the server can separately determine short-term quantity distribution in each time period in chronological order based on the short-term traffic distribution corresponding to each time period by using the quantity prediction model.

A length of the first time interval is different from a length of the second time interval, and the length of the first time interval is greater than the length of the second time interval. For example, if the first time interval is seven days, the server can trace historical data within seven days before the predetermined duration from the historical data, and use the obtained historical data within the seven days as the first historical data. If the second time interval is two days, the server can trace historical data within two days before a current time period from the historical data, and use the obtained historical data within the two days as the second historical data. When short-term traffic distribution in a subsequent time period is predicted, historical data in a second time interval before the time period can be traced.

In one or more embodiments provided in this specification, the server can further adjust the container quantity of the application at each moment within the predetermined duration based on the periodic quantity distribution determined based on the change period of the container quantity of the application and the predicted container quantity distribution. Therefore, in step S106 of this specification, when the container quantity of the application at each moment within the predetermined duration is adjusted based on the container quantity distribution, the server can further determine the target quantity distribution based on the container quantity distribution and the periodic quantity distribution. Then, the server can adjust the container quantity of the application at each moment within the predetermined duration based on the target quantity distribution.

In one or more embodiments provided in this specification, when determining the target quantity distribution, for each moment within the predetermined duration, the server can determine a first quantity corresponding to the moment based on the periodic quantity distribution, and determine a second quantity corresponding to the moment based on the container quantity distribution. When the second quantity is greater than the first quantity, the second quantity is used as a target quantity at the moment, and the target quantity distribution is determined based on the target quantity at each moment within the predetermined duration. When the second quantity is not greater than the first quantity, the server can use the first quantity as a target quantity, and determine the target quantity distribution based on the target quantity at each moment within the predetermined duration.

In one or more embodiments provided in this specification, the server can further use an average value of the first quantity and the second quantity at each moment as a target quantity at each moment, to determine the target quantity distribution within the predetermined duration.

In this specification, because the server needs to update historical data before each time period, prediction for short-term traffic distribution corresponding to each time period is a progressive prediction process. Based on the progressive prediction process, the short-term traffic distribution can be obtained in consideration of the traffic change within the predetermined duration based on the traffic gradually generated within the predetermined duration, so that the finally predicted container quantity is more proper, and adjustment on the container quantity at each moment within the predetermined duration based on each predicted container quantity is more proper and accurate.

In one or more embodiments of this specification, the same traffic prediction model can be used for long-term traffic distribution prediction and short-term traffic distribution prediction. To unify input dimensions, dimensions can be unified by using an interpolation method. For example, 0 is added to the historical data captured based on the second time interval, to obtain input having the same dimension as the historical data captured based on the first time interval.

Alternatively, in one or more embodiments of this specification, the traffic prediction model can include a long-term prediction model and a short-term prediction model, which can be separately trained by using training samples of different dimensions. The long-term prediction model is used to predict long-term traffic distribution, and the short-term prediction model is used to predict short-term traffic distribution.

In one or more embodiments of this specification, input of the long-term prediction model can be actual traffic at each moment in two months in history, and output is traffic distribution in one future day. Input of the short-term prediction model can be actual traffic at each moment in two days in history, and output can be traffic distribution in one future hour.

In step S106 of this specification, the server can adjust, based on the long-term quantity distribution and the short-term quantity distribution, the container quantity configured for the application at each moment within the predetermined duration. Specifically, for each moment within the predetermined duration, the server can determine a first target adjustment quantity corresponding to the moment based on the long-term quantity distribution, and determine a second target adjustment quantity corresponding to the moment based on short-term quantity distribution corresponding to a time period including the moment. Then, the server can adjust the container quantity at the moment based on the first target adjustment quantity and the second target adjustment quantity.

In one or more embodiments provided in this specification, when the container quantity at the moment is adjusted based on the first target adjustment quantity and the second target adjustment quantity, the server can adjust the container quantity at the moment based on a maximum value in the first target adjustment quantity and the second target adjustment quantity. Alternatively, the server can further adjust the container quantity at the moment based on an average value of the first target adjustment quantity and the second target adjustment quantity.

In addition, for an application, total traffic at each moment includes a plurality of types of branch traffic from a plurality of sources. Different types of traffic from different sources consume different container quantities. For two moments with the same total traffic, container quantities that need to be allocated to the application at the two moments can be different due to a difference between branch traffic in the total traffic.

Therefore, in step S102 of this specification, for each predetermined traffic data type, the server can further determine branch traffic corresponding to the traffic data type at each historical moment; and predict each piece of branch traffic of the application at each moment within the predetermined duration as the traffic distribution of the application within the predetermined duration based on the branch traffic corresponding to each traffic data type at each historical moment by using the pre-trained traffic prediction model.

Each predetermined traffic data type can be determined based on traffic data sources and interfaces corresponding to different functions of the application. For example, the traffic data source can include hypertext transfer protocol (HTTP) traffic, message traffic, etc.

In step S104 of this specification, the server can input each piece of branch traffic at each moment within the predetermined duration to the pre-trained quantity prediction model to determine the container quantity that should be configured for the application at each moment within the predetermined duration.

The container quantity includes a container quantity corresponding to each piece of branch traffic, and for same total traffic, container quantities corresponding to different branch traffic are not exactly the same.

In one or more embodiments of this specification, when the container quantity of the application at each moment within the predetermined duration is adjusted based on the container quantity distribution in step S106, for each moment within the predetermined duration, the server can further determine predicted traffic corresponding to the moment based on the traffic distribution, and determine, based on the container quantity distribution, the container quantity that should be configured for the application at the moment. Then, a predicted utilization of the processor in the container corresponding to the moment is determined based on the determined traffic at the moment and the container quantity, and the target utilization is used as a target to adjust the container quantity based on the predicted utilization at the moment.

In one or more embodiments of this specification, the predicted utilization can be determined by using a linear regression model, and an equation for determining the predicted utilization can be specifically as follows:

$$C = b_0 + b_1 x_1 + \ldots + b_n x_n + \epsilon$$

C represents a predicted utilization corresponding to the application at a moment, $b_0$ $b_n$ and $\epsilon$ are parameters obtained by training the linear regression model, $x_1$ to $x_n$ represent stand-alone capabilities corresponding to branch traffic corresponding to the application at the moment, that is, ratios of the predicted branch traffic corresponding to the moment to the container quantity, $$x_n = \frac{F_n}{N},$$

$F_n$ represents the nth type of branch traffic corresponding to the moment, and N represents the predicted container quantity corresponding to the moment. It can be seen that a predicted utilization is negatively correlated with a container quantity at the same moment, and a value of C can be reduced or a value of C can be increased by increasing the container quantity or reducing the container quantity.

In one or more embodiments of this specification, when the target utilization is used as a target to adjust the container quantity based on the predicted utilization at the moment, the server can first determine a search interval of the container quantity based on a relationship between the predicted utilization at the moment and the target utilization, and a predetermined adjustment interval of the container quantity. For example, [countmin, countmax] represents the predetermined adjustment interval, countmin represents a predetermined minimum value of a container quantity allowed to be adjusted, and countmax represents a predetermined maximum value of a container quantity allowed to be adjusted. When the predicted utilization at the moment is greater than the target utilization, to make the predicted utilization at the moment equal to the target utilization or as close to the target utilization as possible, the container quantity can be increased to reduce the predicted utilization at the moment, and the server can determine [countnow, countmax] as a search interval corresponding to the moment. When the predicted utilization at the moment is less than the target utilization, to make the predicted utilization at the moment equal to the target utilization or as close to the target utilization as possible, the container quantity can be reduced to increase the predicted utilization at the moment, and the server can determine [countmin, countnow] as a search interval corresponding to the moment.

countnow represents a container quantity corresponding to the moment that is output by the quantity prediction model, and is in the adjustment interval.

After the search interval is determined, for each container quantity in the adjustment interval, the server can use the container quantity as an interval quantity, and determine predicted utilization corresponding to the interval quantity as an interval utilization based on the interval quantity and traffic corresponding to the moment that is obtained by using the traffic prediction model. Then, the server can determine, from the search interval, an interval quantity that makes the interval utilization not greater than the target utilization, and determine, from the obtained interval quantity, an interval quantity whose corresponding interval utilization has a smallest difference from the target utilization as a container quantity finally configured for the application at the moment.

In one or more embodiments provided in this specification, when the predicted utilization at the moment is equal to the target utilization, the container quantity at the moment does not need to be adjusted based on a predetermined adjustment interval, but the predicted container quantity corresponding to the moment can be directly used as the container quantity finally configured for the application at the moment.

In one or more embodiments provided in this specification, in consideration of different properties of different applications, different applications are suitable for different capacity adjustment modes. For example, some applications are not suitable for frequently adjusting a container quantity, and some applications have good performance can be frequently adjusted. Therefore, an adjustment mode can be further predetermined, to flexibly adjust a container quantity of an application based on application performance.

In one or more embodiments provided in this specification, the server can determine an application profile of the application, determine an adjustment mode suitable for the application based on the application profile, and adjust the container quantity of the application at each moment within the predetermined duration based on the adjustment mode and the container quantity distribution.

For example, the adjustment mode can include low frequency adjustment, periodic adjustment, and high frequency adjustment. If the adjustment mode corresponding to the application is low frequency adjustment, and the low frequency adjustment is once a day, the server can determine a maximum value from the predicted container quantity at each moment within the predetermined duration as an adjustment target, and adjust the container quantity of the application at each moment within the predetermined duration based on the maximum value.

If the adjustment mode corresponding to the application is periodic adjustment, and the predetermined duration includes two period lengths of the application, for each period length, the server can adjust a container quantity at each moment in the period length based on a maximum value in container quantities corresponding to the period length.

If the adjustment mode corresponding to the application is high frequency adjustment, and the high frequency adjustment is once every 5 minutes, the server can segment the predetermined duration by using 5 minutes as a length to determine each time segment, and for each time segment within the predetermined duration, adjust a container quantity at each moment in the time segment based on a maximum value in container quantities corresponding to the time segment. This can be specifically set as needed. This specification sets no limitation here.

In one or more embodiments provided in this specification, the server can determine each label of the application and data corresponding to each label, and determine the application profile of the application based on the data corresponding to each label. A running status of the application is not fixed. Therefore, the application profile can be flexibly updated. For example, the application profile of the application is updated every day by using one day as a cycle.

Each label of the application can be set as needed. For example, the label can include a fact-type label, a description-type label, and a prediction-type label. The fact-type label includes statistical data, including an application running indicator at a moment level (for example, a minute level) in history, an application deployment status, etc. The description-type label includes a label that describes an objective attribute of the application, and is a stable label. Specifically, the description-type label can include an application status, a version, whether traffic is periodic, an annotation of an application developer for application performance, whether the application is a central processing unit (CPU) sensitive application, whether the application is a memory sensitive application, etc. The prediction-type label is a prediction for a subsequent label in a time sequence based on a scenario of the application, and includes time sequence prediction for traffic, and prediction for container quantities of the application in various scenarios (for example, pressure test, traffic guide, and prediction).

In one or more embodiments provided in this specification, data used to determine each label of the application can include at least some of the following data: periodicity of the application (for example, one period per day or two periods per month), related data of an interface associated with each function of the application, a scenario and a node in which the application is currently located (pressure test, emergency, activity, and daily), a capacity feature of the application (whether the application is in a blacklist or a trustlist formulated based on a developer's label, a security level of a CPU utilization of the application, whether the application is memory sensitive, whether the application is CPU sensitive, etc.), whether the application is an intermediate version, a resource status of the application (whether the application is a keep-alive application, whether the application is a mixed application, etc.), a container deployment status of the application (a server model, an equipment room, a station, etc. corresponding to the application), a historical event of the application (a traffic increase status, an alarm status, a traffic limit status, etc.), a service scenario corresponding to the application, etc.

The server can determine the adjustment mode of the application based on one or more of the above-mentioned labels.

In this specification, a capacity is a total resource amount of a container used when the application runs. For example, a capacity corresponding to two 2-core containers is 4 core.

In addition, in this specification, the container quantity that should be allocated to the application at each moment within the predetermined duration can be obtained in a plurality of ways. The above-mentioned description discloses content of adjusting the container quantity at each moment within the predetermined duration based on only one or a combination of a plurality of ways. However, this specification is not limited to the above-mentioned content. When there is no conflict in adjusting the container quantity of the application at each moment within the predetermined duration based on a container quantity that should be allocated to the application at each moment within the predetermined duration and is obtained in various ways, the server can randomly combine results obtained in the above-mentioned several ways to adjust the container quantity at each moment within the predetermined duration.

For example, in one or more embodiments of this specification, in addition to determining the target distribution based on the container quantity distribution and the periodic quantity distribution, the server can alternatively determine the target quantity distribution based on the periodic quantity distribution and the reinforced quantity distribution.

In one or more embodiments of this specification, when adjusting the container quantity of the application at each moment within the predetermined duration based on the target quantity distribution, for each moment, the server can further determine a target container quantity corresponding to the moment from the target quantity distribution, and determine a predicted utilization corresponding to the target quantity; and determine a search interval at the moment based on the predetermined adjustment interval of the container quantity, the predicted utilization, and the predetermined target utilization, to determine, based on the search interval, the container quantity finally configured for the application at the moment.

In one or more embodiments provided in this specification, adjustment on the container quantity of the application at each moment within the predetermined duration based on the periodic quantity distribution is adjustment based on history, adjustment on the container quantity of the application at each moment within the predetermined duration based on the container quantity distribution output by the quantity prediction model is adjustment based on prediction, and adjustment based on the predetermined SLO is real-time dynamic adjustment. The server can flexibly adjust the container quantity of the application at each moment within the predetermined duration based on one or more of the history, the prediction, or the SLO.

In one or more embodiments provided in this specification, when the traffic prediction model is trained in advance, the server can determine each target moment, and for each target moment, use actual traffic at each moment in a first time interval before the target moment as a training sample, and use actual traffic at each moment within predetermined duration after the target moment as a label. After the training sample is input to the traffic prediction model, predicted traffic at each moment within the predetermined duration is obtained. The server can determine a loss based on a difference between actual traffic at each moment and predicted traffic, and adjust a parameter of the traffic prediction model with a goal of minimizing the loss.

In one or more embodiments provided in this specification, when the quantity prediction model is trained in advance, for each target moment, the server can use predicted traffic at each moment within predetermined duration after the target moment that is output by the traffic prediction model as a training sample; use an actual utilization of the processor at each moment within the predetermined duration after the target moment as a label; and determine a loss of the quantity prediction model based on a difference between the predicted utilization at each moment and the actual utilization, and adjust a parameter of the quantity prediction model with a goal of minimizing the loss.

Figure 3:
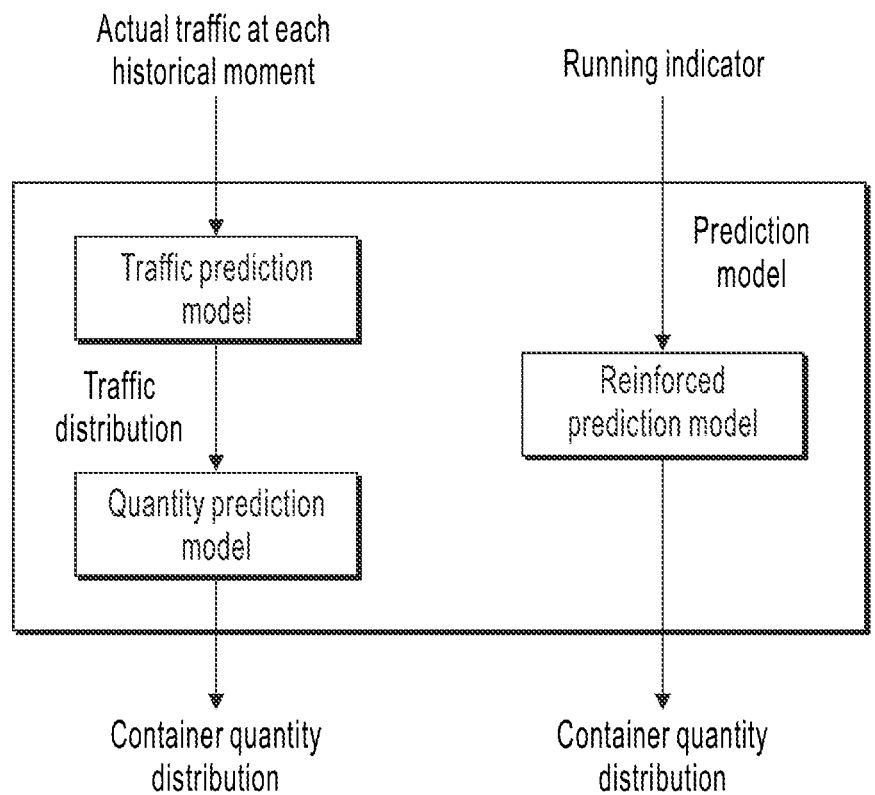
FIG. 3 is a schematic diagram illustrating a prediction model, according to this specification.

FIG. 3 is a schematic diagram illustrating a prediction model according to this specification. As shown in the figure, the prediction model includes a traffic prediction model, a quantity prediction model, and a reinforced prediction model. After actual traffic at each historical moment is input to the traffic prediction model, traffic distribution within predetermined duration after a current moment is obtained. After the traffic distribution is input to the quantity prediction model, container quantity distribution within the predetermined duration can be obtained. After a running indicator of an application is input to the reinforced prediction model, reinforced quantity distribution within predetermined duration after the current moment can be obtained.

Figure 4:
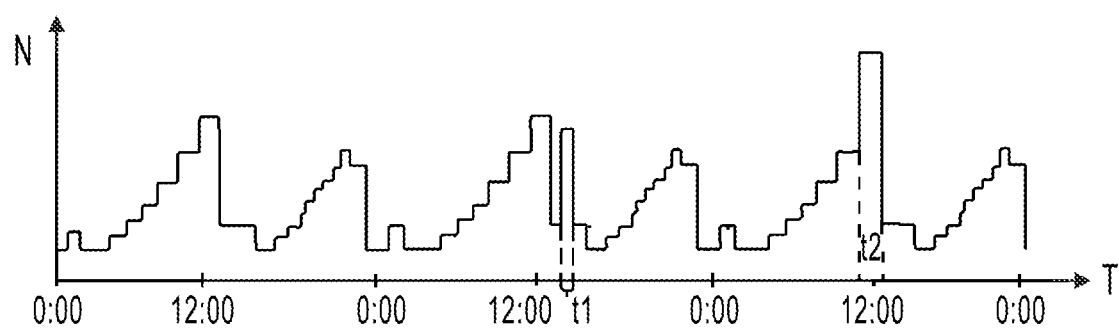
FIG. 4 is a schematic diagram illustrating container quantity adjustment, according to this specification.

FIG. 4 is a schematic diagram illustrating container quantity adjustment according to this specification. As shown in the figure, the vertical axis N represents container quantity and the horizontal axis represents time T. It can be seen that the container quantity of the application changes periodically, and the container quantity has two peaks in one day. In time periods t1 and t2, because traffic increases suddenly, the server increases the container quantity in time periods t1 and t2.

The above describes the container quantity adjustment method for an application provided in one or more embodiments of this specification. Based on the same idea, this specification further provides a corresponding container quantity adjustment apparatus for an application, as shown in FIG. 5.

Figure 5:
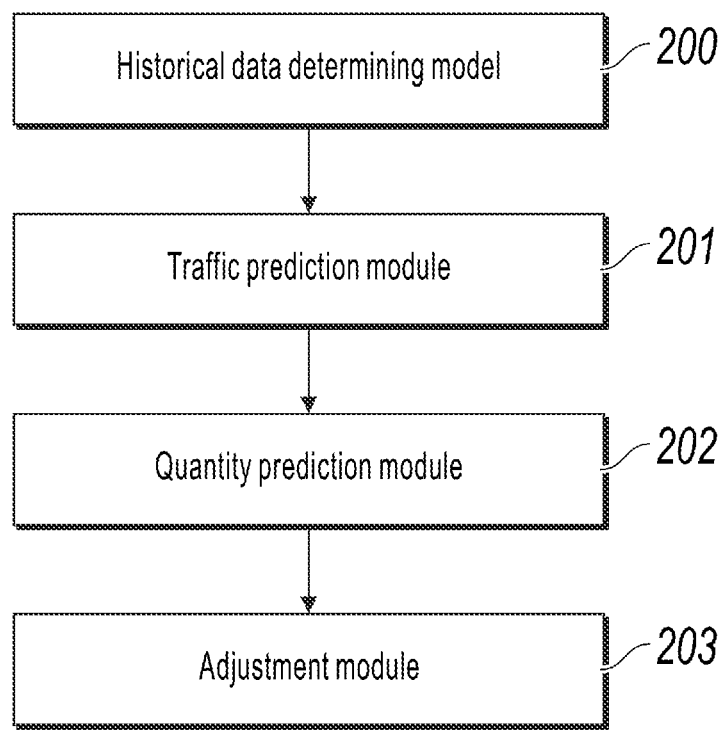
FIG. 5 is a schematic diagram illustrating a container quantity adjustment apparatus for an application, according to this specification.

FIG. 5 is a schematic diagram illustrating a container quantity adjustment apparatus for an application according to this specification. The apparatus includes the following: a historical data determining module 200, configured to determine historical data of an application, where the historical data include at least actual traffic of the application at each historical moment; a traffic prediction module 201, configured to predict traffic distribution of the application within predetermined duration based on the historical data by using a pre-trained traffic prediction model; a quantity prediction module 202, configured to predict container quantity distribution of the application within the predetermined duration based on the traffic distribution and a predetermined target utilization of a container by using a pre-trained quantity prediction model; and an adjustment module 203, configured to adjust a container quantity of the application at each moment within the predetermined duration based on the container quantity distribution.

Optionally, the historical data determining module 200 is further configured to determine historical quantity distribution based on a container quantity configured for the application at each historical moment; and determine the historical data of the application when determining, based on the historical quantity distribution, that the container quantity of the application at each historical moment changes periodically.

The apparatus further includes a period determining module 204, configured to determining a period length of a container quantity change of the application based on the historical quantity distribution; determine each target historical period based on a predetermined period quantity and the period length; determine a container quantity at each historical moment in each target historical period based on the historical quantity distribution; and determine the container quantity at each moment within the predetermined duration as periodic quantity distribution based on the container quantity at each historical moment in each target historical period.

Optionally, the adjustment module 203 is further configured to determine target quantity distribution based on the container quantity distribution and the periodic quantity distribution; and adjust the container quantity of the application at each moment within the predetermined duration based on the target quantity distribution.

Optionally, the adjustment module 203 is further configured to: for each moment within the predetermined duration, determine predicted traffic corresponding to the moment based on the traffic distribution and determine, based on the container quantity distribution, a container quantity that should be configured for the application at the moment; determine, based on the determined traffic at the moment and the container quantity, a predicted utilization of a processor in the container that corresponds to the moment; and adjust the container quantity based on the predicted utilization at the moment by using the target utilization as a target.

Optionally, the historical data further include historical predicted traffic of the application at each historical moment, a historical predicted quantity of containers, and a historical actual utilization of a processor; and the adjustment module 203 is further configured to determine a historical predicted utilization at each historical moment based on historical predicted traffic and a historical predicted quantity at each historical moment within the predetermined duration before a current moment; determine accuracy of the quantity prediction model based on the historical actual utilization and the historical predicted utilization at each historical moment; and adjust the container quantity of the application at each moment within the predetermined duration based on the container quantity distribution when the accuracy is greater than a predetermined proportion threshold; or determine the container quantity of the application at each moment within the predetermined duration based on initialized quantity distribution of the application when the accuracy is not greater than a predetermined proportion threshold.

Optionally, the adjustment module 203 is further configured to: for each historical moment within the predetermined duration before the current moment, determine a difference between a historical predicted utilization and a historical actual utilization at the historical moment as a utilization difference at the historical moment; determine a quantity of historical moments that are within the predetermined duration before the current moment and at which a utilization difference is less than a predetermined difference threshold as a compliance quantity; and determine the accuracy based on the compliance quantity and a total quantity of historical moments within the predetermined duration before the current moment.

The apparatus further includes a regression module 205, configured to determine a loss based on the utilization difference corresponding to each historical moment within the predetermined duration before the current moment; and adjust parameters of the quantity prediction model and the traffic prediction model with a goal of minimizing the loss.

Optionally, the adjustment module 203 is further configured to obtain a running indicator of the application; predict the container quantity distribution of the application within the predetermined duration as reinforced quantity distribution based on the running indicator and the target utilization by using a reinforced prediction model obtained through advance reinforcement learning; and adjust the container quantity of the application at each moment within the predetermined duration based on the reinforced quantity distribution when evaluation on the quantity prediction model fails.

Optionally, the traffic prediction module 201 is further configured to: for each predetermined traffic data type, determine branch traffic corresponding to the traffic data type at each historical moment; and predict each piece of branch traffic of the application at each moment within the predetermined duration as the traffic distribution of the application within the predetermined duration based on the branch traffic corresponding to each traffic data type at each historical moment by using the pre-trained traffic prediction model.

Optionally, the quantity prediction module 202 is further configured to input each piece of branch traffic at each moment within the predetermined duration and the predetermined target utilization of the container to the pre-trained quantity prediction model and determine a container quantity that should be configured for the application at each moment within the predetermined duration, where the container quantity includes a container quantity corresponding to each piece of branch traffic, and for same traffic, container quantities corresponding to different branch traffic are not exactly the same.

Optionally, the adjustment module 203 is further configured to determine an application profile of the application and determine, based on the application profile, an adjustment mode suitable for the application; and adjust the container quantity of the application at each moment within the predetermined duration based on the adjustment mode and the container quantity distribution.

This specification further provides a computer-readable storage medium. The storage medium stores a computer program, and the computer program can be used to perform the container quantity adjustment method for an application provided in FIG. 1.

Figure 6:
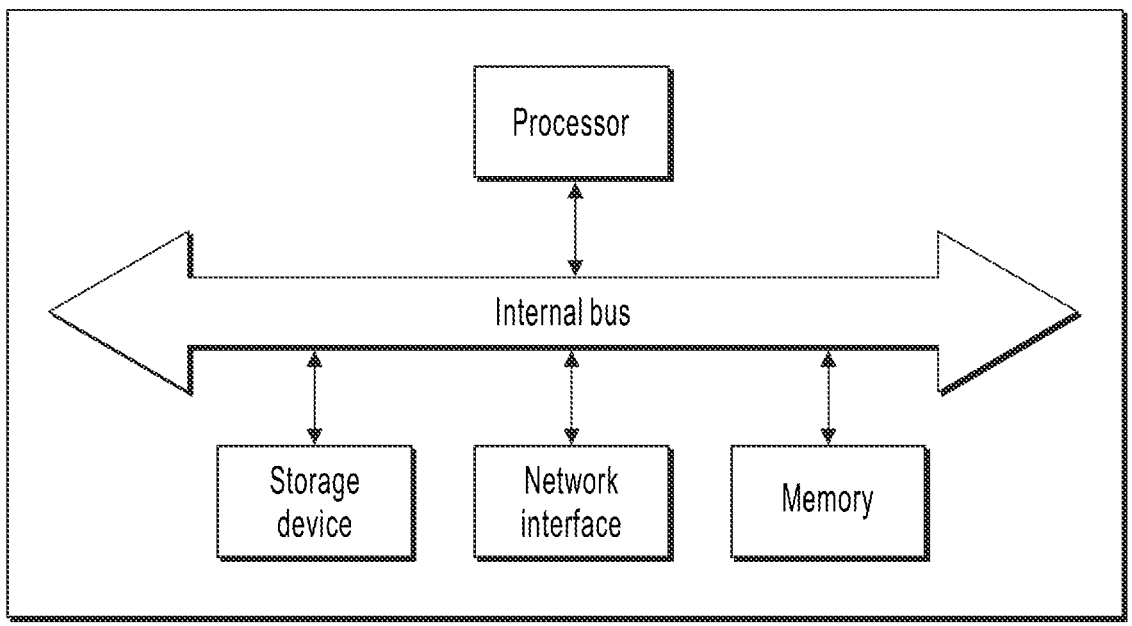
FIG. 6 is a schematic structural diagram illustrating an electronic device, according to this specification.

This specification further provides a schematic structural diagram of an electronic device shown in FIG. 6. As shown in FIG. 6, in a hardware aspect, the electronic device includes a processor, an internal bus, memory, and a non-volatile storage device, and certainly can further include hardware necessary for another service. The processor reads a corresponding computer program from the non-volatile storage device and runs the computer program in the memory, to implement the container quantity adjustment method for an application provided in FIG. 1.

Certainly, in addition to a software implementation, this specification does not rule out another implementation, for example, a logic component or a combination of software and hardware. To be specific, an execution body of the following processing procedure is not limited to each logical unit, and can be hardware or a logical component.

In the 1990s, whether improvement to a technology is hardware improvement (for example, improvement to a circuit structure such as a diode, a transistor, or a switch) or software improvement (improvement to a method procedure) can be clearly identified. However, with development of technologies, improvement to many existing method procedures can be considered as direct improvement to hardware circuit structures. Almost all designers obtain a corresponding hardware circuit structure by programming an improved method procedure into a hardware circuit.

Therefore, improvement to a method procedure can be implemented by using a hardware entity module. For example, a programmable logic device (PLD) (for example, a field programmable gate array (FPGA)) is such an integrated circuit, and a logical function of the programmable logic device is determined by programming a component by a user. A designer autonomously performs programming to "integrate" a digital system onto a PLD, without requesting a chip manufacturer to design and manufacture a dedicated integrated circuit chip. In addition, currently, instead of manually producing an integrated circuit chip, such programming is usually implemented by using "logic compiler" software, which is similar to a software compiler used during program development and writing. Original code to be compiled needs to be written in a specific programming language, which is referred to as a hardware description language (HDL). There is not only one HDL, but there are many HDLs such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Speed Integrated Circuit Hardware Description Language (VHDL) and Verilog are most commonly used. It should also be clear to a person skilled in the art that a hardware circuit for implementing a logical method procedure can be easily obtained by performing slight logic programming on the method procedure by using the above-mentioned several hardware description languages and programming the method procedure into an integrated circuit.

The controller can be implemented in any suitable way. For example, the controller can be in a form of a microprocessor or a processor and a computer-readable medium storing computer-readable program code (for example, software or firmware) that can be executed by the (micro) processor, a logic gate, a switch, an application-specific integrated circuit (ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A storage device controller can further be implemented as a part of control logic of a storage device. A person skilled in the art also knows that, in addition to implementing the controller by using only computer-readable program code, logic programming can be performed on a method step, so that the controller implements a same function in a form of a logic gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Alternatively, an apparatus for implementing various functions can be considered as a software module that can implement a method or a structure in the hardware component.

The system, apparatus, module, or unit described in the above-mentioned embodiments can be specifically implemented by a computer chip or entity, or can be implemented by a product that has a specific function. A typical implementation device is a computer. Specifically, the computer can be, for example, a personal computer, a laptop computer, a cellular phone, a camera phone, a smartphone, a personal digital assistant, a media player, a navigation device, an e-mail device, a game console, a tablet computer, a wearable device, or any combination of these devices.

For ease of description, the above-mentioned apparatus is divided into units based on functions. Certainly, during implementation of this specification, functions of units can be implemented in the same or more software or hardware.

A person skilled in the art should understand that embodiments of this application can be provided as a method, a system, or a computer program product. Therefore, this application can be in a form of a hardware-only embodiment, a software-only embodiment, or an embodiment combining software and hardware aspects. In addition, this application can be in a form of a computer program product implemented on one or more computer-usable storage media (including but not limited to a magnetic disk storage device, a CD-ROM, an optical storage device, etc.) including computer-usable program code.

This application is described with reference to at least one of the flowcharts or block diagrams of the method, the device (system), and the computer program product according to embodiments of this application. It should be understood that computer program instructions can be used to implement each process or each block in at least one of the flowcharts or the block diagrams and a combination of at least one of a process or a block in at least one of the flowcharts or the block diagrams. These computer program instructions can be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts or in one or more blocks in the block diagrams.

These computer program instructions can alternatively be stored in a computer-readable storage device that can indicate a computer or another programmable data processing device to work in a specific way, so that the instructions stored in the computer-readable storage device generate an artifact that includes an instruction apparatus. The instruction apparatus implements a specific function in one or more processes in the flowcharts or in one or more blocks in the block diagrams.

These computer program instructions can alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts or in one or more blocks in the block diagrams.

In a typical configuration, the computing device includes one or more processors (CPU), input/output interfaces, network interfaces, and memory.

The memory can include a form such as a non-permanent memory, a random access memory (RAM), or a non-volatile memory in a computer-readable medium, for example, a read-only memory (ROM) or a flash memory (flash RAM). The memory is an example of the computer-readable medium.

Computer-readable media, including permanent and non-permanent media or removable and non-removable media, can store information according to any method or technology. The information can be computer-readable instructions, a data structure, a module of a program, or other data. Examples of the storage medium of the computer include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disk (DVD) or another optical storage, a magnetic cassette tape, a magnetic disk storage or another magnetic storage device, or any other non-transmission medium, which can be configured to store information accessible to a computing device. As specified in this specification, the computer-readable medium does not include transitory computer-readable media (transitory media), such as a modulated data signal and a carrier.

It should also be noted that the term "include" or any other variant thereof is intended to cover a non-exclusive inclusion, so that a process, a method, a commodity, or a device that includes a list of elements not only includes those elements but also includes other elements that are not expressly listed, or further includes elements inherent to such a process, method, commodity, or device. In a case without more restrictions, for an element limited by the statement "include a . . . ", a process, method, commodity, or device that includes the element can further include another same element.

A person skilled in the art should understand that embodiments of this specification can be provided as a method, a system, or a computer program product. Therefore, this specification can be in a form of a hardware-only embodiment, a software-only embodiment, or an embodiment combining software and hardware aspects. In addition, this specification can be in a form of a computer program product implemented on one or more computer-usable storage media (including but not limited to a magnetic disk storage device, a CD-ROM, an optical storage device, etc.) including computer-usable program code.

This specification can be described in a general context of a computer-executable instruction executed by a computer, for example, a program module. Typically, program modules include routines, programs, objects, components, data structures, etc. that perform specific tasks or implement specific abstract data types. This specification can also be practiced in a distributed computing environment in which tasks are performed by remote processing devices connected via a communication network. In the distributed computing environment, a program module can be located in local and remote computer storage media including a storage device.

Embodiments in this specification are all described in a progressive way, for same or similar parts in embodiments, mutual reference can be made to these embodiments, and each embodiment focuses on a difference from other embodiments. In particular, for the system embodiment, because the system or system embodiment is basically similar to the method embodiment, descriptions are relatively simple. For related parts, references can be made to the descriptions in the method embodiment.

The above descriptions are merely embodiments of this specification, and are not intended to limit this specification. A person skilled in the art can make various modifications or changes to this specification. Any modification, equivalent replacement, or improvement made without departing from the spirit and principle of this application shall fall within the scope of the claims of this specification.

The invention claimed is:

1. A computer-implemented method, comprising:
   in response to determining that a container quantity of an application at each of a plurality of historical moments changes periodically, determining historical data of the application, wherein the historical data comprise traffic of the application at each of the plurality of historical moments;
   predicting traffic distribution of the application within a predetermined duration based on the historical data by using a pre-trained traffic prediction model;
   predicting container quantity distribution of the application within the predetermined duration based on the traffic distribution and a predetermined target utilization of a container by using a pre-trained quantity prediction model; and
   adjusting a container quantity of the application at each of a plurality of predetermined moments within the predetermined duration based on the container quantity distribution.

2. The computer-implemented method according to claim 1, wherein the determining historical data of an application that the container quantity of the application at each of the plurality of historical moments changes periodically comprises:
   determining historical quantity distribution based on the container quantity of the application at each of the plurality of historical moments; and
   determining, based on the historical quantity distribution, that the container quantity of the application at each of the historical moments changes periodically.

3. The computer-implemented method according to claim 2, wherein the method further comprises:
   determining a period length of a container quantity change of the application based on the historical quantity distribution;
   determining each of a plurality of target historical periods based on a quantity of predetermined periods and the period length;
   determining a container quantity at each of the historical moments in each of the plurality of target historical periods based on the historical quantity distribution; and
   determining the container quantity at each of the plurality of predetermined moments within the predetermined duration as periodic quantity distribution based on the container quantity at each of the plurality of historical moments in each of the plurality of target historical periods.

4. The computer-implemented method according to claim 3, wherein the adjusting a container quantity of the application comprises:
   determining target quantity distribution based on the container quantity distribution and the periodic quantity distribution; and
   adjusting the container quantity of the application at each of the plurality of predetermined moments within the predetermined duration based on the target quantity distribution.

5. The computer-implemented method according to claim 1, wherein the adjusting a container quantity of the application comprises:
   for each of the plurality of predetermined moments within the predetermined duration:
      determining predicted traffic corresponding to the respective predetermined moment based on the traffic distribution;

determining, based on the container quantity distribution, a container quantity to be configured for the application at the respective predetermined moment;

determining, based on the predicted traffic at the respective predetermined moment and the container quantity, a predicted utilization of a processor in the container corresponding to the respective predetermined moment; and adjusting the container quantity based on the predicted utilization at the respective predetermined moment by using the predetermined target utilization as a target quantity.

6. The computer-implemented method according to claim 1, wherein the historical data further comprise historical predicted traffic of the application at each of the plurality of historical moments, a historical predicted quantity of containers, and a historical utilization of a processor in the container; and wherein the adjusting a container quantity of the application comprises:

determining a historical predicted utilization at each of the plurality of historical moments based on historical predicted traffic and a historical predicted quantity at each historical moment of the plurality of historical moments within the predetermined duration before a current moment;

determining accuracy of the pre-trained quantity prediction model based on the historical utilization and the historical predicted utilization at each of the plurality of the historical moments;

determining whether the accuracy is greater than a predetermined proportion threshold; and in response to determining that the accuracy is greater than the predetermined proportion threshold, adjusting the container quantity of the application at each of the predetermined moments within the predetermined duration based on the container quantity distribution; or in response to determining that the accuracy is less than or equal to the predetermined proportion threshold, determining the container quantity of the application at each of the predetermined moments within the predetermined duration based on initialized quantity distribution of the application.

7. The computer-implemented method according to claim 6, wherein the determining accuracy of the pre-trained quantity prediction model comprises:

for each historical moment within the predetermined duration before the current moment:

determining a difference between a historical predicted utilization and a historical utilization at the respective historical moment as a utilization difference at the respective historical moment;

determining a quantity of historical moments within the predetermined duration before the current moment and at which a utilization difference is less than a predetermined difference threshold as a compliance quantity; and determining the accuracy based on the compliance quantity and the quantity of historical moments within the predetermined duration before the current moment.

8. The computer-implemented method according to claim 7, wherein the method further comprises:

determining a loss based on the utilization difference corresponding to each historical moment within the predetermined duration before the current moment; and adjusting parameters of the pre-trained quantity prediction model and the pre-trained traffic prediction model that minimize the loss.

9. The computer-implemented method according to claim 6, wherein the method further comprises:

obtaining a running indicator of the application;

predicting the container quantity distribution of the application within the predetermined duration as reinforced quantity distribution based on the running indicator and the predetermined target utilization by using a reinforced prediction model obtained through advance reinforcement learning; and adjusting the container quantity of the application at each of the plurality of predetermined moments within the predetermined duration based on the reinforced quantity distribution when evaluation on the pre-trained quantity prediction model fails.

10. The computer-implemented method according to claim 1, wherein the predicting traffic distribution of the application within the predetermined duration comprises:

for each of a plurality of traffic data types:

determining branch traffic corresponding to the traffic data type at each of the plurality of historical moments; and predicting branch traffic of the application at each of the plurality of predetermined moments within the predetermined duration as the traffic distribution of the application within the predetermined duration based on the branch traffic corresponding to each traffic data type by using the pre-trained traffic prediction model.

11. The computer-implemented method according to claim 10, wherein the predicting container quantity distribution of the application within the predetermined duration comprises:

inputting the branch traffic at each of the plurality of predetermined moments within the predetermined duration and the predetermined target utilization of the container to the pre-trained quantity prediction model; and determining a container quantity to be configured for the application at each of the plurality of predetermined moments within the predetermined duration, wherein the container quantity and the branch traffic have a one-to-one correspondence, and container quantities corresponding to different branch traffics are not identical.

12. The computer-implemented method according to claim 1, wherein the adjusting a container quantity of the application comprises:

determining an application profile of the application;

determining, based on the application profile, an adjustment mode for the application; and adjusting the container quantity of the application at each of the plurality of predetermined moments within the predetermined duration based on the adjustment mode and the container quantity distribution.

13. A non-transitory, computer-readable medium storing one or more instructions executable by a computer system to perform operations comprising:

in response to determining that a container quantity of an application at each of a plurality of historical moments changes periodically, determining historical data of the application, wherein the historical data comprise traffic of the application at each of the plurality of historical moments;

predicting traffic distribution of the application within a predetermined duration based on the historical data by using a pre-trained traffic prediction model;

predicting container quantity distribution of the application within the predetermined duration based on the traffic distribution and a predetermined target utilization of a container by using a pre-trained quantity prediction model; and adjusting a container quantity of the application at each of a plurality of predetermined moments within the predetermined duration based on the container quantity distribution.

14. The non-transitory, computer-readable medium according to claim 13, wherein the determining that the container quantity of the application at each of the plurality of historical moments changes periodically comprises:

determining historical quantity distribution based on the container quantity of the application at each of the plurality of historical moments; and determining, based on the historical quantity distribution, that the container quantity of the application at each of the historical moments changes periodically.

15. The non-transitory, computer-readable medium according to claim 14, wherein the operations further comprises:

determining a period length of a container quantity change of the application based on the historical quantity distribution;

determining each of a plurality of target historical periods based on a quantity of predetermined periods and the period length;

determining a container quantity at each of the historical moments in each of the plurality of target historical periods based on the historical quantity distribution; and determining the container quantity at each of the plurality of predetermined moments within the predetermined duration as periodic quantity distribution based on the container quantity at each of the plurality of historical moments in each of the plurality of target historical periods.

16. The non-transitory, computer-readable medium according to claim 15, wherein the adjusting a container quantity of the application comprises:

determining target quantity distribution based on the container quantity distribution and the periodic quantity distribution; and adjusting the container quantity of the application at each of the plurality of predetermined moments within the predetermined duration based on the target quantity distribution.

17. The non-transitory, computer-readable medium according to claim 13, wherein the adjusting a container quantity of the application comprises:

for each of the plurality of predetermined moments within the predetermined duration:

determining predicted traffic corresponding to the respective predetermined moment based on the traffic distribution;

determining, based on the container quantity distribution, a container quantity to be configured for the application at the respective predetermined moment;

determining, based on the predicted traffic at the respective predetermined moment and the container quantity, a predicted utilization of a processor in the container corresponding to the respective predetermined moment; and adjusting the container quantity based on the predicted utilization at the respective predetermined moment by using the predetermined target utilization as a target quantity.

18. The non-transitory, computer-readable medium according to claim 13, wherein the historical data further comprise historical predicted traffic of the application at each of the plurality of historical moments, a historical predicted quantity of containers, and a historical utilization of a processor in the container; and wherein the adjusting a container quantity of the application comprises:

determining a historical predicted utilization at each of the plurality of historical moments based on historical predicted traffic and a historical predicted quantity at each historical moment of the plurality of historical moments within the predetermined duration before a current moment;

determining accuracy of the pre-trained quantity prediction model based on the historical utilization and the historical predicted utilization at each of the plurality of the historical moments;

determining whether the accuracy is greater than a predetermined proportion threshold; and in response to determining that the accuracy is greater than the predetermined proportion threshold, adjusting the container quantity of the application at each of the predetermined moments within the predetermined duration based on the container quantity distribution; or in response to determining that the accuracy is less than or equal to the predetermined proportion threshold, determining the container quantity of the application at each of the predetermined moments within the predetermined duration based on initialized quantity distribution of the application.

19. The non-transitory, computer-readable medium according to claim 18, wherein the determining accuracy of the pre-trained quantity prediction model comprises:

for each historical moment within the predetermined duration before the current moment:

determining a difference between a historical predicted utilization and a historical utilization at the respective historical moment as a utilization difference at the respective historical moment;

determining a quantity of historical moments within the predetermined duration before the current moment and at which a utilization difference is less than a predetermined difference threshold as a compliance quantity; and determining the accuracy based on the compliance quantity and the quantity of historical moments within the predetermined duration before the current moment.

20. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

in response to determining that a container quantity of an application at each of a plurality of historical moments changes periodically, determining historical data of the application, wherein the historical data comprise traffic of the application at each of the plurality of historical moments;

predicting traffic distribution of the application within a predetermined duration based on the historical data by using a pre-trained traffic prediction model;

predicting container quantity distribution of the application within the predetermined duration based on the traffic distribution and a predetermined target utilization of a container by using a pre-trained quantity prediction model; and adjusting a container quantity of the application at each of a plurality of predetermined moments within the predetermined duration based on the container quantity distribution.

* * * * *

UNITED STATES PATENT AND TRADEMARK OFFICE
CERTIFICATE OF CORRECTION

Page 1 of 1

PATENT NO. : 12,418,581 B2
APPLICATION NO. : 18/397379
DATED : September 16, 2025
INVENTOR(S) : Yun Hu, Lei Lei and Yangfei Zheng It is certified that error appears in the above-identified patent and that said Letters Patent is hereby corrected as shown below:

In the Claims

Column 28, Line 22, Claim 2, please replace "determining historical data of an application that" with -- determining that --.

Signed and Sealed this
Eighteenth Day of November, 2025

John A. Squires
*Director of the United States Patent and Trademark Office*